March 15, 1966  C. H. K. SJOBOHM  3,240,238
METHOD OF MAKING SPRINGS
Original Filed Oct. 19, 1961  4 Sheets-Sheet 1
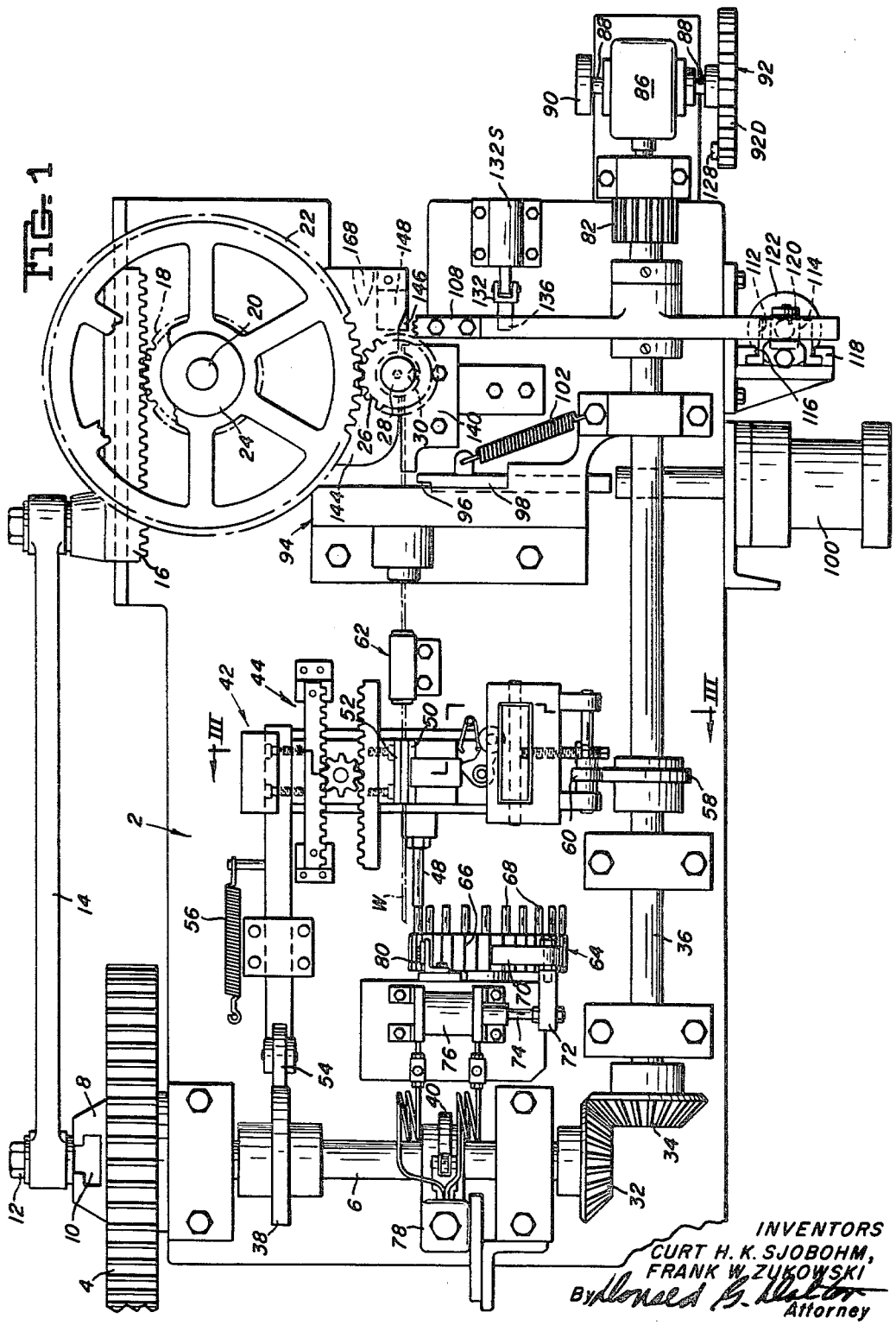
INVENTORS
CURT H. K. SJOBOHM,
FRANK W. ZUKOWSKI
By *[signature]*
Attorney

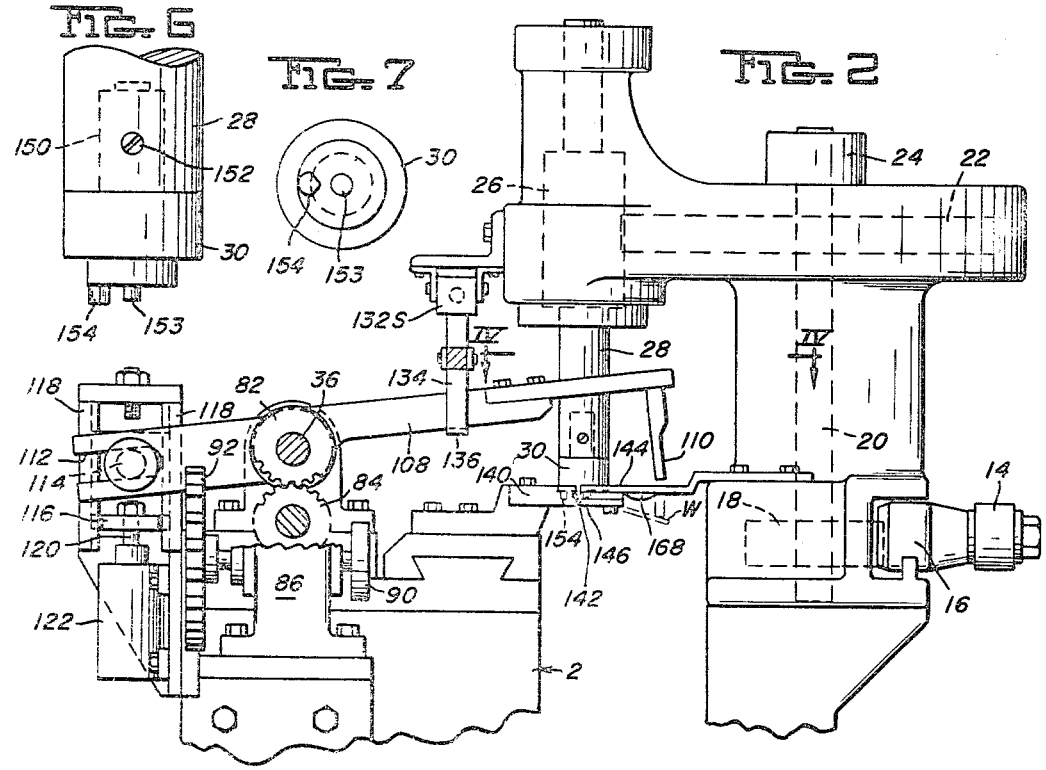
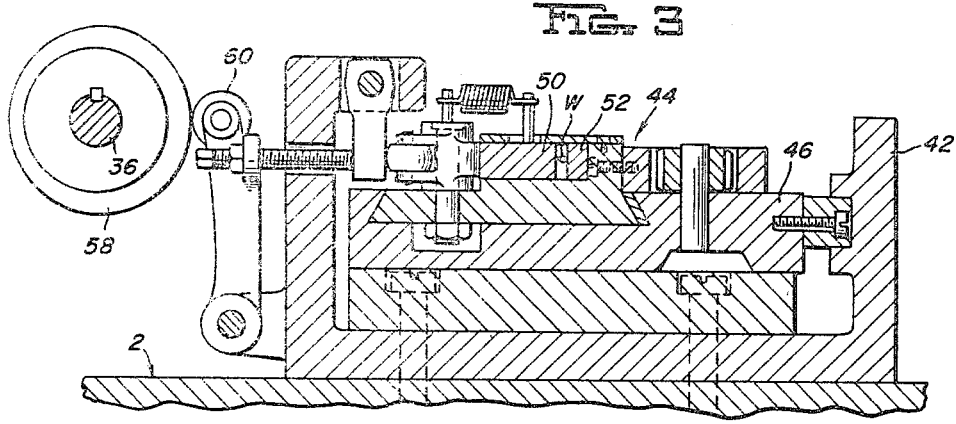

March 15, 1966  C. H. K. SJOBOHM  3,240,238
METHOD OF MAKING SPRINGS
Original Filed Oct. 19, 1961  4 Sheets-Sheet 3
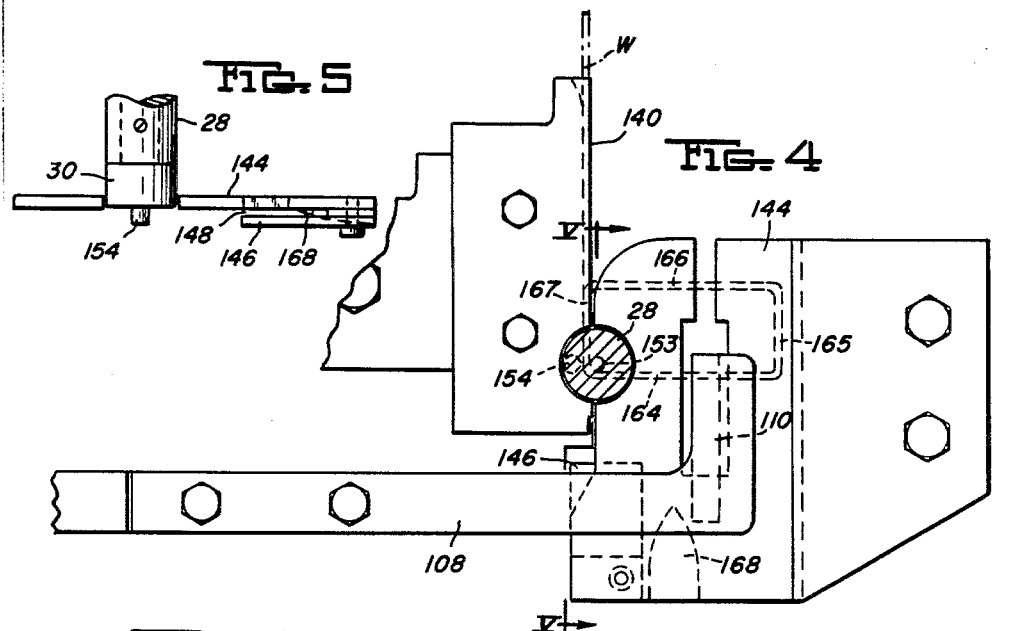
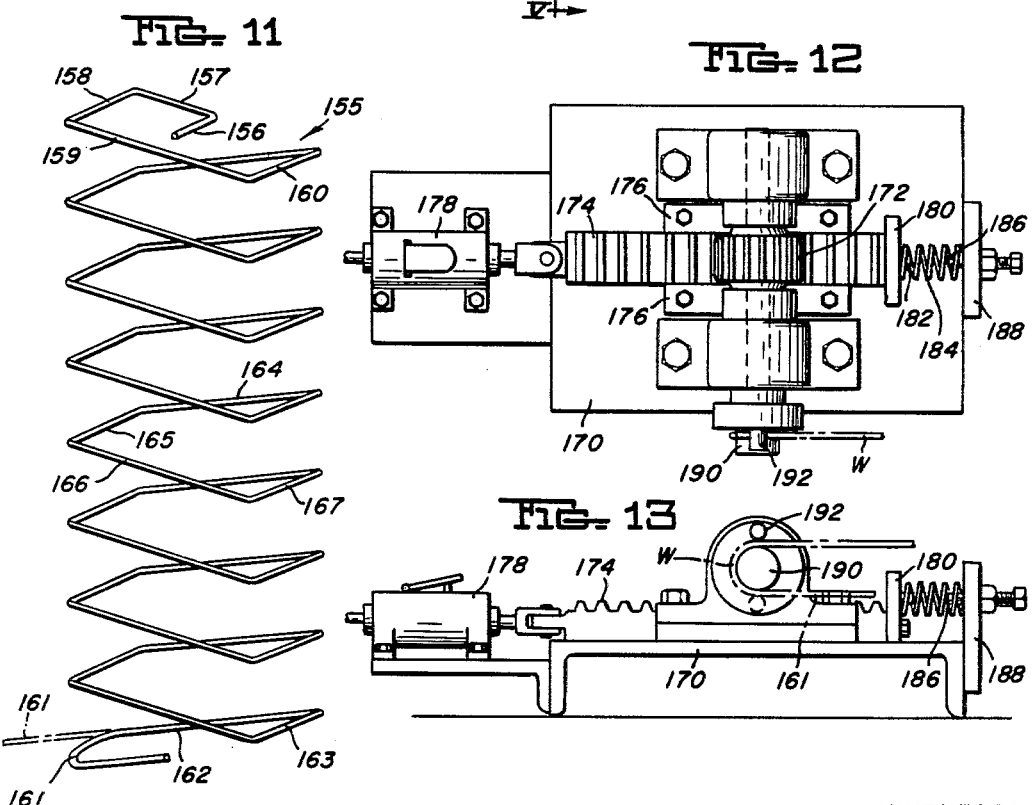
INVENTORS
CURT H. K. SJOBOHM,
FRANK W. ZUKOWSKI
By Ronald G. Dalton
Attorney March 15, 1966   C. H. K. SJOBOHM   3,240,238
METHOD OF MAKING SPRINGS
Original Filed Oct. 19, 1961   4 Sheets-Sheet 4
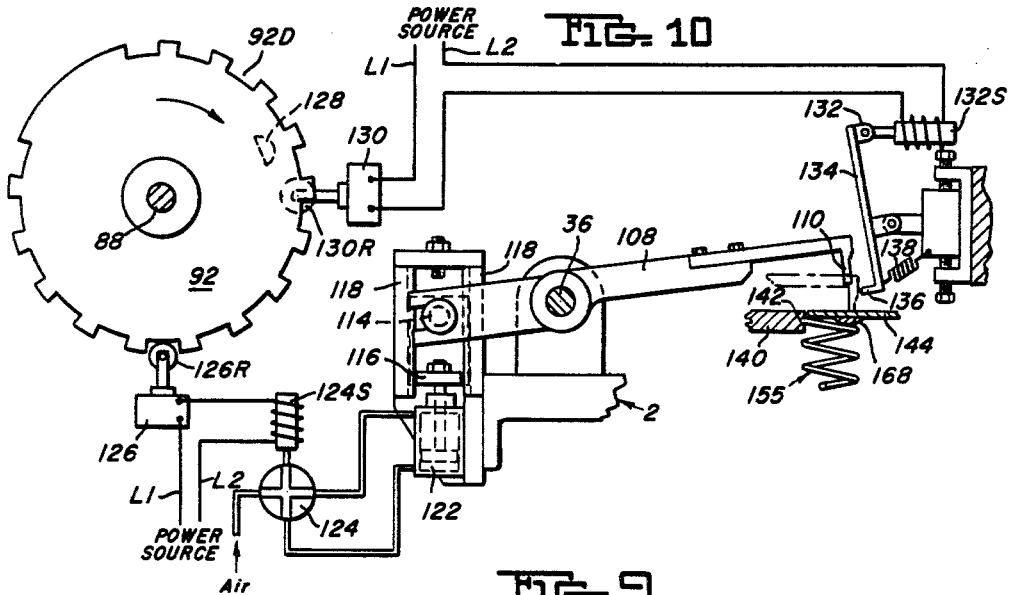
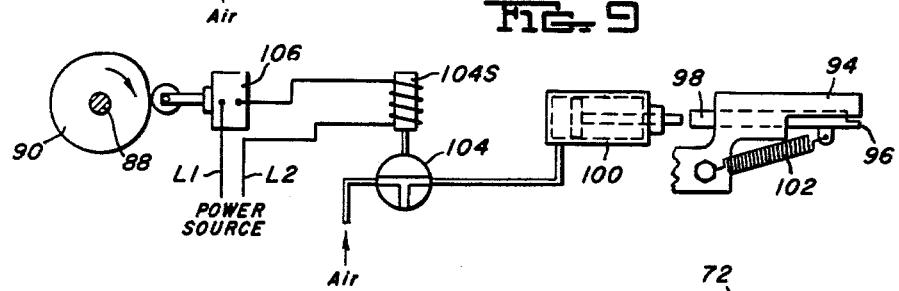
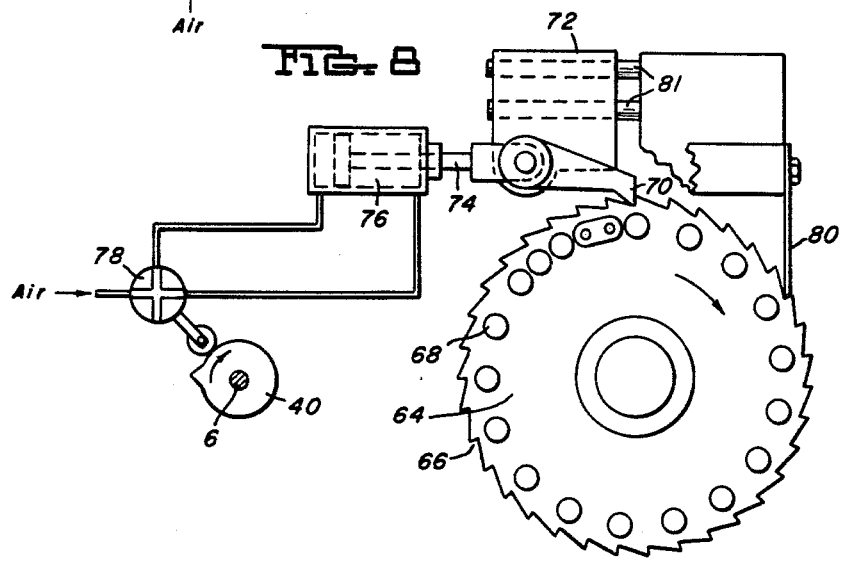
INVENTORS
CURT H. K. SJOBOHM,
FRANK W. ZUKOWSKI
By *Donald S. Walton*
Attorney

United States Patent Office 3,240,238
Patented Mar. 15, 1966

3,240,238
METHOD OF MAKING SPRINGS
Curt H. K. Sjobohm and Frank W. Zukowski, Worcester, Mass., assignors to United States Steel Corporation, a corporation of Delaware
Original application Oct. 19, 1961, Ser. No. 146,185. Divided and this application Oct. 13, 1964, Ser. No. 403,611
5 Claims. (Cl. 140—71)

This application, which is a division of my co-pending application Serial No. 146,185, filed October 19, 1961, relates to a method of making springs and more particularly to the making of magazine springs for rifles. Such springs are made up of a plurality of generally oblong convolutions intermediate the ends with the first end having a generally square portion whose sides are approximately the same length as the short side of the oblong convolutions. The other end of the spring has a curved portion. Prior to our invention this spring was made by using a spiral coiler to make long lengths of oblong convolutions. The long length of convolutions were then cut into sections of sufficient length to form a single spring. The first end of the spring was then formed in a separate machine, it being necessary to bend the one portion of the wire out of its original shape and to trim the end to the correct length. In making the second end of the spring it was necessary to straighten part of a convolution already formed, rebend it to form the curved end and trim it to exact length. The finishing steps in making the spring were difficult and required a great deal of labor so that the cost of manufacturing the spring was very high. In addition, the reverse bending and straightening with subsequent reforming resulted in a great number of defective springs. In some cases the ends of the springs where heated during the straightening operation.

It is therefore a object of our invention to provide a cheap and accurate method of making magazine springs.

This and other objects will be more apparent after referring to the following specification and attached drawings, in which:

FIGURE 1 is a plan view of a machine for performing a part of the steps of our method and with center parts omitted for the purpose of clarity;

FIGURE 2 is an elevation of the front end of the machine with parts broken away and shown in section;

FIGURE 3 is a view taken on the line III—III of FIGURE 1;

FIGURE 4 is a view taken on the line IV—IV of FIGURE 2;

FIGURE 5 is a view taken on the line V—V of FIGURE 4;

FIGURE 6 is an enlarged view of the spring winding arbor as attached to the spindle;

FIGURE 7 is a plan view of the lower part of the arbor;

FIGURE 8 is a schematic view showing the control for a portion of the feeding mechanism;

FIGURE 9 is a schematic view showing the control for the cut-off mechanism;

FIGURE 10 is a schematic view showing the control for the pitch mechanism;

FIGURE 11 is a view of a spring formed by our invention;

FIGURE 12 is a plan view of a bending machine used in forming a bend in the end of a spring; and FIGURE 13 is an elevation of the machine of FIGURE 12.

Referring more particularly to the drawings, the reference numeral 2 indicates a stand for supporting the machine of FIGURES 1 to 10. A gear 4 is attached to a shaft 6 which is rotatably mounted on the stand 2. Power for rotating the gear 4 is provided from any suitable source. The face of the gear 4 is provided with diametrical guideways 8 for adjustment therein of a head 10 which carries a crank pin 12. One end of a connecting rod 14 is connected to the crank pin. The other end of the connecting rod 14 is pivotally connected to a slidable rack 16 which is guided in a horizontal path by means of suitable slideways on the supporting stand 2. The stroke of the sliding rack may be varied by adjusting the position of the head 10 in the guideways 8. The teeth of the rack 16 are in mesh with the teeth of a pinion 18 which is mounted on a vertical shaft 20. A large gear 22 is rotatably mounted on the top of the shaft 20 and is driven by means of a clutch 24, such as the one shown in the patent to Thomas No. 1,935,137. The gear 22 is in mesh with a pinion 26 which is secured to a vertical spindle 28. A spring winding arbor 30 is attached to the bottom of spindle 28. A bevel gear 32 is mounted on the free end of shaft 6 and is in mesh with a similar bevel gear 34 mounted on a rotatable shaft 36 which extends toward the front of the machine. Cams 38 and 40 are mounted on shaft 6 for rotation therewith. A bracket 42 for the wire feeding mechanism 44 is attached to the supporting frame 2 between the cam 38 and the front of the machine. The wire feeding mechanism 44 may be of any conventional type and that shown is that disclosed in Sjobohm Patents No. 2,794,477 dated June 4, 1958 and No. 2,919,014 dated December 29, 1959. Other parts of the machine so far described, excet for cam 40, are also similar to that disclosed in the Sjobohm patents. Regardless of what type of feeding mechanism is used it will include a slide 46 to which is attached a rearwardly extending screw or pin 48. The slide 46 also carries a movable jaw 50 and a stationary jaw 52. The slide 46 is moved toward the front of the machine by means of cam 38 contacting a roller 54 attached to the slide and is retracted by means of a spring 56. A cam 58 is mounted on shaft 36 intermediate its length and contacts a roller 60 to move jaw 50 so as to grip a wire W between jaws 50 and 52. Since the feeding mechanism does not per se form any part of the present invention no further description thereof is necessary. The wire W being fed passes through apparatus 62 which permits the wire to feed forwardly but prevents backward movement thereof. Apparatus suitable for this purpose is shown in the patent to Delihanty No. 1,026,567.

A rotatable ratchet wheel 64 is mounted with its axis parallel to the direction of movement of slide 46. As best shown schematically in FIGURE 8 the ratchet wheel 64 includes peripheral teeth 66 and adjustably mounted or removable studs 68 which are adapted selectively to align with pin 48. A pawl 70 is pivotally mounted on a slide 72 which is attached to piston rod 74 of a double acting air cylinder 76. A 4-way valve 78 operated by cam 40 controls the flow of air to the cylinder 76. A flat spring 80 is mounted in position to bear against the ratchet wheel teeth 66 to provide a braking action and to prevent overtravel of the ratchet wheel 64. The slide 72 is mounted for movement on rods 81.

A spur gear 82 mounted on the front end of shaft 36 is in mesh with a spur gear 84 which drives a gear reducer 86 having a shaft 88 extending from both ends thereof. Cams 90 and 92 are mounted on opposite ends of shaft 88. A standard type wire cutter 94 is mounted on frame 2 and includes a cutting blade 96 mounted on slide 98 for movement toward and away from the path of movement of wire W on the feed side of arbor 30. As shown in FIGURE 9 an air cylinder 100 moves the slide 98 on its cutting stroke and a spring 102 retracts the slide 98. A 3-way solenoid valve 104 controls flow of air to and from the cylinder 100. Flow of current to solenoid 104S from power source L1, L2 is controlled by means of a micro switch 106. Operation of switch 106 is controlled by cam 90.

A pitch lever 108 is pivotally mounted on shaft 36 and is free to rotate thereon. The end of lever 108 adjacent spindle 28 has a downwardly extending finger 110 thereon. The other end of lever 108 has a slot 112 therein for receiving a roller 114 mounted on a slide 116 which reciprocates in guides 118. The slide 116 is attached to the piston rod 120 of a double acting air cylinder 122. As shown in FIGURE 10 air flow to cylinder 122 is controlled by means of a solenoid operated 4-way valve 124. Flow of current from power source L1, L2 to solenoid 124S is controlled by a micro switch 126 which has a roller 126R on its operating arm. The timing wheel or cam 92 has a plurality of depressions 92D around the periphery thereof and the switch 126 will be closed when the roller 126R is in any of the depressions 92D and open in the other positions. By suitable selection of the length of arc of the depressions 92D and the spacing thereof the timing of movement of arm 108 and the time it remains in down position can be controlled to make different shapes and sizes of springs. A lug 128 is mounted on the cam 92 and is adapted to contact roller 130R of a micro switch 130 which is mounted in circuit with a solenoid 132S. An arm 134 pivotally mounted adjacent its ends has one end pivotally connected to arm 132 actuated by solenoid 132S. The free end of arm 134 has a finger 136 which is adapted to move into engagement with and prevent or limit downward movement of the arm 108. A spring 138 attached to the bottom of arm 134 returns it to retracted position when solenoid 132S is deenergized.

As shown in FIGURES 2, 4 and 5 a guide 140 having a semicircular groove 142 therein for guiding the wire W is located adjacent the arbor 30 on the entry side thereof and is mounted on stand 2 in any suitable manner. A hold down guide plate 144 is also mounted on stand 2 with its end abutting guide plate 140 just above groove 142. A guide plate 146 is mounted below plate 144 on the exit side of arbor 30 with a horizontal slot 148 therebetween so as to receive and guide the wire W as it is fed forwardly and for a short arc of its travel as it is being formed.

As best shown in FIGURE 6 the arbor 30 is received in an opening 150 in the bottom of spindle 28 and is adjustably held in place by means of set screw 152. Vertical pins 153 and 154 are secured to the bottom of arbor 30 in a usual manner.

FIGURE 11 shows a magazine spring 155 which can be made by our method. The spring 155 includes an end consisting of slides 156, 157, 158, 159 and 160 all in the same plane. The other end of the spring 155 includes a bent portion 161 connected to a long side 162 which in turn is connected to a short side 163. Between the two ends of the spring 155 are a plurality of convolutions each consisting of a long leg 164, a short leg 165 in the same plane as leg 164, a long leg 166 extending at an angle to leg 164, and a short leg 167 in the same plane as leg 166.

In making the spring 155 a ratchet wheel 64 is provided having pins 68 mounted thereon with the proper spacing and projections. A suitable cam wheel 92 is also selected and the machine started in operation with the wire W positioned in the feeding mechanism which is in its rear position ready to grip the wire. The stop pin 48 is aligned with a ratchet pin 68 since it is desired to feed a short length of wire corresponding to side 156. As the cam 58 rotates it causes the jaws to grip the wire W therebetween and the rotating cam 38 then causes the slide 46 to move forwardly, thus feeding the wire between the pins 153 and 154. The arbor 30 is rotated in timed relationship with the feed of the wire through an angle of 90° to put a bend in the wire. The jaws are released from the wire W as the cam 58 continues to rotate and the slide retracted by spring 56 as the cam 38 continues its rotation. As the slide 46 is moving forwardly the cam 40 actuates the valve 78 to a position where air is delivered to the front of cylinder 76 so as to retract the slide 72. As the slide 46 reaches its extreme forward position the cam 40 moves out of contact with valve 78 which is then positioned to deliver air to the rear of cylinder 76 so as to move the pawl 70 and advance the ratchet wheel 64 a distance equal to one tooth on its periphery. This positions a second pin of slightly different length than the first pin 68 in alignment with pin 48 so that as the slide retracts pin 48 will abut it. The above operations will be repeated for sides 157 and 158. After side 158 is formed no pin 68 is positioned in line with pin 48 since side 159 is longer than sides 156, 157 and 158. Thus the pin 48 will contact the side of wheel 64 and a longer length of wire will be fed to correspond to the length of side 159. After side 159 has been formed as described above a pin 68 of the same length as the pin used for side 158 will be aligned with pin 48 and the side 160 will be formed. After side 160 is formed side 164 is formed in the same manner as side 159. However, in the meantime cam 92 will have been rotating in timed relationship with the other parts of the machine so that the roller 126R will be in a depression 92D. Thus the switch 126 will close and actuate the arm 108 to contact leg 164 and form the desired pitch in the leg 164. During this time the wire is free to rotate, but upon completion of the pitching action the wire is again gripped by the jaws 50 and 52 to retain the pitch and prevent uncoiling after the pitch finger 110 is retracted. The pitch finger remains in contact with the wire until another tooth or raised portion is reached by the cam 92 to open the switch 126. This will occur after formation of side 166, sides 165 and 167 being formed in the same manner as side 160. The operations described will continue until formation of side 163 and formation of the bend between sides 162 and 163. At this time lug 128 will close switch 130 to energize solenoid 132S and move finger 136 under finger 110 so as to limit movement of finger 110 which has been actuated by cam 92. When these operations have been completed the cam 90 will close switch 106, thus opening valve 104 to cause cutter 96 to cut the wire off of a length from the last bend to include portions 161 and 162. The machine is then ready to form another spring.

In some instances it may also be desired to form a pitch in the short sides 165 and 167. For this purpose a wedge 168 is mounted beneath the plate 144 in the position shown in FIGURES 2, 4 and 5 with its entry end a distance from the axis of the arbor 30 less than the length of sides 164 and 166 to its center a distance from the line of travel of the wire less than the length of the short sides 165 and 167. As the wire forming the long legs is fed forwardly the formed short leg at the end thereof will contact the wedge 168 and direct it downwardly. Thus when the wire is relieved from the grip of the jaws 50 and 52 it will be rotated about its axis so that the pitch is formed in the short leg.

The looped portion 161 is formed in the wire in any suitable manner. For example, the apparatus shown in FIGURES 12 and 13 may be used. This includes a base 170 having a pinion 172 rotatably mounted thereon in suitable bearings. A rack 174 in mesh with pinion 172 is mounted for sliding movement in guides 176 and is actuated by means of a foot operated air cylinder 178. An abutment 180 at the end of rack 174 opposite cylinder 178 carries a guide pin 182 for receiving a spring 184. A guide pin 186 mounted on an abutment 188 carried by base 170 supports the other end of spring 182, which returns the rack 174 when air is released from cylinder 178. A pin 190 is mounted on the axis of pinion 172 and a pin 192 is mounted on an extension of pinion 172 in spaced relationship with pin 190. With the pin 192 in the full line position shown in FIGURE 13 the operator positions the wire containing portions 161 and 162 as shown between pins 190 and 192 and then actuates cylinder 178 to rotate the pinion 172 with the pin 192 moving to the broken line position shown so as to form the bend therein. Air is then released from cylinder 178 permitting spring 184 to return the rack 174 and pinion 172 to their original position.

While one embodiment of our invention has been shown and described, it will be apparent that other adaptations and modifications may be made without departing from the scope of the following claims.

We claim:

1. The method of making a plurality of magazine springs each having a plurality of generally oblong convolutions, said method comprising providing a wire of such length as to provide for a plurality of springs, feeding a length of wire sufficient to form a long side of a convolution to an oscillating arbor having means for receiving the wire, then feeding a length of wire sufficient to form a short side of a convolution, continuing the last two steps and correlating the feed with the oscillations of the arbor while forming the desired pitch in the convolutions until all of the convolutions in a spring are formed, then severing the wire, and repeating the above operations to form another spring.

2. The method of making a plurality of magazine springs each having a plurality of generally rectangular convolutions intemediate its ends, a first end having a generally rectangular portion of differetn configuration than the rectangular convolutions connected to the first of said rectangular convolutinos and a second end having a curved portion connected to the last of said rectangular convolutions, said method comprising providing a wire of such length as to provide fo ra plurality of springs, feeding the wire in successive steps to an oscillating arbor having means for receiving the wire, the increments and length of feed being correlated with the oscillations of the arbor to form the rectangular portion of the first end of the spring, continuing feeding of the wire in successive steps of such length correlated with the oscillations of the arbor to form the intermediate convolutions and forming the desired pitch in said intermediate convolutions, after the intermediate convolutions are formed severing the wire at a distance from the intermediate portions to provide a straight length of wire of sufficient length to include the second end of said spring, bending the said straight end to provide the said curved portion, and repeating the above operations to form further springs from the said length of wire.

3. The method of making a plurality of magazine springs each having a plurality of generally oblong convolutions intermediate its ends, a first end having a generally square portion connected to the first of said oblong convolutions and a second end having a curved portion connected to the last of said oblong convolutions, said method comprising providing a wire of such length as to provide for a plurality of springs, feeding the wire three successive equal steps to an oscillating arbor having means for receiving the wire and correlating the feed with the oscillations of the arbor to form the said generally square portion, then feeding a length of wire sufficient to form a long side of an intermediate convolution, then feeding a length of wire sufficient to form a short side of an intermediate convolution, continuing the last two steps until all the intermediate convolutions are formed while forming the desired pitch in said intermediate convolutions, after the intermediate convolutions are formed severing the wire at a distance from the intermediate portions to provide a straight length of wire of sufficient length to include the second end of said spring, bending the said straight end to provide the said curved portion, and repeating the above operations to form another spring.

4. The method of making a plurality of magazine springs each having a plurality of generally rectangular convolutions intermediate its ends, a first end and a second end, the first and second ends having shapes different than the intermediate convolutions, said method comprising providing a wire of such length as to provide for a plurality of springs, feeding the wire in successive steps to an oscillating arbor having means for receiving the wire, the increments and length of feed being correlated with the oscillations of the arbor to form the first end of the spring, continuing feeding of the wire in successive steps of lengths varying from the length fed in the initial feeding step and correlating the feed with the oscillations of the arbor to form the intermediate convolutions while forming the desired pitch in said intermediate convolutions, after the intermediate convolutions are formed severing the wire at a distance from the intermediate portions to provide a straight length of wire of sufficient length to form the second end of said spring, and repeating the above operations to form further springs from the said length of wire.

5. The method of making a plurality of magazine springs each having a plurality of generally rectangular convolutions intermediate its ends, a first end having a generally rectangular portion smaller than the intermediate convolutions and a second end having a different shape than the convolutions and said first end, said method comprising providing a wire of such length as to provide for a plurality of springs, feeding the wire in successive steps to an oscillating arbor having means for receiving the wire, the increments and length of feed being correlated with the oscillations of the arbor to form the first end of the spring, continuing feeding of the wire in successive steps of lengths varying from the length fed in the initial feeding step and correlating the feed with the oscillations of the arbor to form the intermediate convolutions while forming the desired pitch in said intermediate convolutions, after the intermediate convolutions are formed severing the wire at a distance from the intermediate portions to provide a straight length of wire of sufficient length to include the second end of said spring, and repeating the above operations to form further springs from the said length of wire.

References Cited by the Examiner

UNITED STATES PATENTS

| | | | |
|---|---|---|---|
| 3,045,740 | 7/1962 | Davis | 153—64 |
| 3,067,780 | 12/1962 | Kahn | 140—103 |

CHARLES W. LANHAM, *Primary Examiner.*